(12) United States Patent
Bettentrup et al.

(10) Patent No.: US 11,187,082 B2
(45) Date of Patent: Nov. 30, 2021

(54) METHOD FOR MAKING STEEL OR TITANIUM PRODUCTS CONTAINING A PRECIPITATION-HARDENING NICKEL-BASE ALLOY, AND PART

(71) Applicant: Siemens Aktiengesellschaft, Munich (DE)

(72) Inventors: Jörn Bettentrup, Dorsten (DE); Stefan Brußk, Mülheim an der Ruhr (DE); Alexander Luithle, Bochum (DE); Jörg Schürhoff, Fröndenberg (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 130 days.

(21) Appl. No.: 15/763,298

(22) PCT Filed: Sep. 9, 2016

(86) PCT No.: PCT/EP2016/071260
§ 371 (c)(1),
(2) Date: Mar. 26, 2018

(87) PCT Pub. No.: WO2017/060033
PCT Pub. Date: Apr. 13, 2017

(65) Prior Publication Data
US 2018/0274366 A1    Sep. 27, 2018

(30) Foreign Application Priority Data

Oct. 7, 2015    (DE) .......................... 102015219351.9

(51) Int. Cl.
*F01D 5/00*    (2006.01)
*B23K 1/00*    (2006.01)
(Continued)

(52) U.S. Cl.
CPC ............ *F01D 5/005* (2013.01); *B23K 1/0018* (2013.01); *B23K 9/04* (2013.01); *B23K 26/342* (2015.10);
(Continued)

(58) Field of Classification Search
None
See application file for complete search history.

(56) References Cited

U.S. PATENT DOCUMENTS

| 2,649,273 A | 8/1953 | Honegger |
| 3,479,157 A | 11/1969 | Richards et al. |

(Continued)

FOREIGN PATENT DOCUMENTS

| AT | 270245 B | 4/1969 |
| CN | 103290333 A | 9/2013 |

(Continued)

OTHER PUBLICATIONS

Locq and Caron; On Some Advanced Nickel-Based Superalloys for Disk Applications; Journal Aerospace Lab—Issue 3—Nov. 2011 (Year: 2011).*

(Continued)

*Primary Examiner* — Juan G Flores
(74) *Attorney, Agent, or Firm* — Schmeiser, Olsen & Watts LLP

(57) ABSTRACT

Combining a precipitation-hardening nickel-base alloy with a steel or titanium substrate makes it very easy to repair parts, the nickel-base alloy having good erosion-resistant properties. A method for producing is disclosed. In particular for repairing, a component having a substrate, in particular turbine blades made of steel or titanium, in particular made of martensitic or precipitation-hardening chromium-rich steels, with a localized deposition weld or with an affixed shaped part, in which a precipitation-hardening nickel-based (Continued)

alloy is used as the localized deposition weld or as the shaped part, in which a laser powder deposition weld or an arc deposition weld is performed.

8 Claims, 1 Drawing Sheet

(51) Int. Cl.
*B23K 9/04* (2006.01)
*B23K 26/342* (2014.01)
*B23P 6/00* (2006.01)
*C22C 19/05* (2006.01)
*F01D 5/28* (2006.01)
*B23K 101/00* (2006.01)
*B23K 103/18* (2006.01)

(52) U.S. Cl.
CPC ............ *B23P 6/007* (2013.01); *C22C 19/056* (2013.01); *F01D 5/00* (2013.01); *F01D 5/28* (2013.01); *B23K 2101/001* (2018.08); *B23K 2103/18* (2018.08); *F05D 2230/232* (2013.01); *F05D 2230/234* (2013.01); *F05D 2230/237* (2013.01); *F05D 2230/238* (2013.01); *F05D 2300/13* (2013.01); *F05D 2300/171* (2013.01)

(56) References Cited

U.S. PATENT DOCUMENTS

| | | | |
|---|---|---|---|
| 3,857,542 A | 12/1974 | Heymann | |
| 5,666,841 A * | 9/1997 | Seeger | B21H 7/16 |
| | | | 72/110 |
| 6,085,417 A * | 7/2000 | Anderson, III | B23K 35/304 |
| | | | 29/889.1 |
| 7,491,275 B2 * | 2/2009 | Cao | C22F 1/10 |
| | | | 148/410 |
| 8,821,785 B2 * | 9/2014 | Voice | B23P 6/002 |
| | | | 419/9 |
| 2002/0172587 A1 | 11/2002 | Keller et al. | |
| 2003/0213536 A1 | 11/2003 | Cao | |
| 2005/0072500 A1 | 4/2005 | Cao et al. | |
| 2005/0106012 A1 | 5/2005 | Scarlin | |
| 2009/0155623 A1 | 6/2009 | Ayer et al. | |
| 2013/0133793 A1 | 5/2013 | McDevitt | |
| 2013/0224033 A1 | 8/2013 | Arai et al. | |
| 2014/0017415 A1 * | 1/2014 | Lin | C23C 26/00 |
| | | | 427/580 |
| 2015/0275687 A1 | 10/2015 | Bruck et al. | |

FOREIGN PATENT DOCUMENTS

| | | |
|---|---|---|
| DE | 3813157 A1 | 12/1988 |
| DE | 19953079 A1 | 5/2001 |
| DE | 10112062 A1 | 9/2002 |
| DE | 10348424 A1 | 5/2005 |
| EP | 0822319 A2 | 2/1998 |
| EP | 1642666 A1 | 4/2006 |
| EP | 2684981 A2 | 1/2014 |

OTHER PUBLICATIONS

Li—Turbine Engineering Materials (Year: 2010).*
International Search Report for PCT International Application No. PCT/EP2016/071260 dated Dec. 1, 2016.
Non-English Chinese Office Action for Application No. 201680059154.5, dated Nov. 1, 2019.
Li, Xiangqi:, "Marine Engineering Materials", pp. 118; May 2010.
Non-English Chinese Office Action for Application No. 201680059154.5, dated Jun. 28, 2020.

* cited by examiner

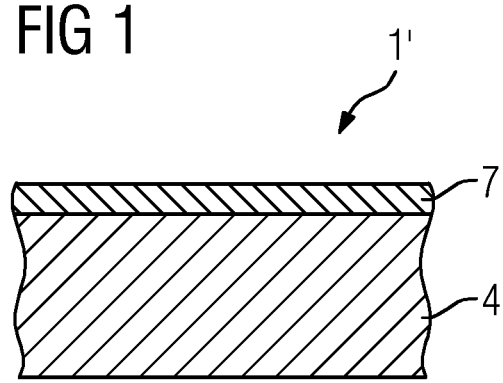
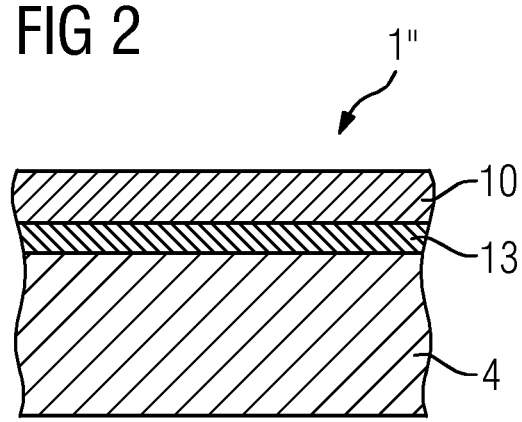

METHOD FOR MAKING STEEL OR TITANIUM PRODUCTS CONTAINING A PRECIPITATION-HARDENING NICKEL-BASE ALLOY, AND PART

CROSS-REFERENCE TO RELATED APPLICATIONS

This application claims priority to PCT Application No. PCT/EP2016/071260, having a filing date of Sep. 9, 2016 based off of German application No. 102015219351.9 having a filing date of Oct. 7, 2015, the entire contents of both of which are hereby incorporated by reference.

FIELD OF TECHNOLOGY

The following relates to the production of steel or titanium products, in particular from the high-temperature range, wherein for welding use is made of a precipitation-hardening nickel-based alloy, and to a component.

BACKGROUND

When overhauling low-pressure blades of steam turbines made of steel or titanium, the following measures are taken, depending on the degree of damage:
1 Time-limited continued operation of the damaged blade—insofar as permissible—with a new inspection interval and with the drawback that owing to the removal of material the natural frequency of the blade is different and also the efficiency is impaired.
2 Replacing the blade with a substitute blade or new part, in the event that the degree of damage does not permit continued operation.
3 Repairing the blade by welding using a cobalt-based alloy which is very resistant to water droplet erosion. Owing to the poor suitability for welding, processing is very difficult and onerous. The large difference in material properties between the repair material and the base material can lead to residual stresses, cracks and even spalling.
4 As for 3, but with a primer, which does however make the process more demanding.

SUMMARY

An aspect relates to solving the aforementioned problems.

DESCRIPTION OF THE DRAWINGS

Some of the embodiments will be described in detail, with reference to the following figures, wherein like designations denote like members, wherein:
FIG. 1 shows an exemplary embodiment of the invention;
FIG. 2 shows another exemplary embodiments of the invention.

DETAILED DESCRIPTION

A method is disclosed for producing, in particular for repairing, a component (1', 1") having a substrate (4), in particular turbine blades made of steel or titanium, in particular made of martensitic or precipitation-hardening chromium-rich steels, with a localized deposition weld (7) or with an affixed shaped part (10), in which a precipitation-hardening nickel-based alloy is used as the localized deposition weld (7) or as the shaped part (10), in which a laser powder deposition weld or an arc deposition weld is performed.

A component (1', 1") is disclosed, in particular produced having a substrate (4) made of steel or titanium, in particular made of martensitic or precipitation-hardening chromium-rich steels, and having only locally material of a precipitation-hardening nickel-based alloy, in which a laser powder deposition weld or an arc deposition weld is performed.

Nickel-based materials, in the precipitation-hardened state after suitable heat treatment, can be very resistant to water droplet erosion and moreover are distinguished by their good weldability in comparison to the cobalt-based group of materials. An onerous primer is not required.

The welding can preferably be performed using suitable methods such as laser welding or arc welding.

The deposition weld can advantageously have just one layer.

Another possibility is to braze in place shaped parts (inserts).

Nickel-based superalloys with the precipitation hardening on the basis of γ' are known from gas turbine engineering, in which precipitation-hardening nickel-based alloys are also again used to repair these alloys (like-for-like repair).

Unexpectedly, the combination of precipitation-hardening nickel-based alloys and substrate 4 made of steel or titanium, this meaning titanium and titanium alloys as material, (FIGS. 1 and 2) achieved very good results which a person skilled in the art would on one hand not have expected and would also never have used, since substrates are always welded with identical or similar materials.

The shaped part 10 (insert) which is welded or brazed in or on is then also made of a precipitation-hardening nickel-based alloy.

The shaped part 10 or the deposition weld is heat-treated prior to or after connection. The insert 10 and the substrate 4 are joined by simple material bonding and then have a connection layer or brazing layer 13 (FIG. 2).

When a shaped part 10 is brazed in place for the new production or repair of a component 1", it is possible to use any desired brazing material, wherein the shaped part 10 also has a precipitation-hardening nickel-based alloy.

Preferably, the method is used to produce or repair leading edges of turbine blades, in particular of steam turbines.

The nickel-based alloy as a deposition weld 7 or as a shaped part 10 is preferably present only locally in or on the substrate 4 of the component 1', 1".

Deposition welding 7 is performed in particular by laser powder deposition welding or by arc deposition welding.

The precipitation-hardening nickel-based alloy preferably has the following composition:
a chromium content (Cr) of 10 wt % to 21 wt %
and/or
a niobium content (Nb) of 0.1 wt % to 5.5 wt %
and/or
a molybdenum content of 0.1 wt % to 3.3 wt %,
in particular IN 718.

The nickel-based alloy that is used preferably has a γ' fraction ≤50%, in particular ≤40%, most particularly ≤30%.

The deposition weld 7 preferably has just one layer.

$X_{20}Cr_{13}$, $X_5CrNiCuNb_{16}{}^{-4}$ or $TiAl_6V_4$ are preferably used as the material for the substrate 4.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for repairing a leading edge of a turbine blade component, comprising:
   providing the turbine blade component as a substrate, wherein the substrate is made of martensitic or precipitation-hardening chromium-rich steels, wherein the substrate is not a nickel-based alloy or a nickel-based superalloy, and wherein the substrate is $X_5CrNiCuNb_{16}^{-4}$, and
   connecting a precipitation-hardening nickel-based alloy to the substrate proximate the leading edge of the turbine blade component, with a localized deposition weld or with an affixed shaped part, wherein the localized deposition weld is formed by a laser powder deposition weld or an arc deposition weld,
   wherein the precipitation-hardening nickel-based alloy has a chromium content of 10 wt % to 13.75 wt % and/or a molybdenum content of 0.1 wt % to 2.5 wt %.

2. The method as claimed in claim 1, in which the shaped part made of a precipitation-hardening nickel-based alloy is connected to the substrate.

3. The method as claimed in claim 1, in which the shaped part made of a precipitation-hardening nickel-based alloy is brazed into or onto the substrate.

4. The method as claimed in claim 1, having a γ' fraction≤30%, for the precipitation-hardening nickel-based alloy.

5. The method as claimed in claim 1, in which the deposition weld has just one layer.

6. The method as claimed in claim 1, wherein the precipitation-hardening nickel-based alloy is corrosion-resistant, nickel chromium alloy.

7. A component, comprising:
   a substrate, wherein the substrate is a turbine blade made of martensitic or precipitation-hardening chromium-rich steel, wherein the substrate is not a nickel-based alloy or a nickel-based superalloy, and wherein the substrate is $X_5CrNiCuNb_{16}^{-4}$, and
   a precipitation-hardening nickel-based alloy, wherein the precipitation-hardening nickel-based alloy is present only locally on a leading edge of the turbine blade as a deposition weld or as a shaped part, further wherein the deposition weld is formed by a laser powder deposition weld or an arc deposition weld,
   wherein the precipitation-hardening nickel-based alloy has a chromium content of 10 wt % to 13.75 wt % and/or a molybdenum content of 0.1 wt % to 2.5 wt %.

8. A turbine blade component, the turbine blade component comprising:
   a substrate, wherein the substrate is not a nickel-based alloy or a nickel-based superalloy, and wherein the substrate is $TiAl_6V_4$; and
   a precipitation-hardening nickel-based alloy having a chromium content of 10 wt % to 13.75 wt % and/or a molybdenum content of 0.1 wt % to 2.5 wt %;
   wherein the precipitation-hardening nickel-based alloy comprises at least one of:
      a shaped part, located only locally on the substrate in a leading edge region of the turbine blade component, wherein the shaped part is brazed to the substrate; and
      a deposition weld located only locally on the substrate in the leading edge region of the turbine blade component.

* * * * *